Dec. 11, 1923.

J. C. SPROULL 1,476,775

METHOD AND APPARATUS FOR MAKING ABRASION TESTS

Filed Dec. 24, 1921   2 Sheets-Sheet 1

Inventor
John C. Sproull.
By Robert McPierson
Atty.

Dec. 11, 1923.  
J. C. SPROULL  
1,476,775  
METHOD AND APPARATUS FOR MAKING ABRASION TESTS  
Filed Dec. 24, 1921   2 Sheets-Sheet 2

Inventor  
John C. Sproull.  
By Robert M. Pierson  
Atty.

Patented Dec. 11, 1923.

1,476,775

UNITED STATES PATENT OFFICE.

JOHN C. SPROULL, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING ABRASION TESTS.

Application filed December 24, 1921. Serial No. 524,729.

*To all whom it may concern:*

Be it known that I, JOHN C. SPROULL, a citizen of the United States, residing at Akron, in the county of Summit and State of Ohio, have invented a certain new and useful Method and Apparatus for Making Abrasion Tests, of which the following is a specification.

This invention relates to the art of testing articles or materials to determine their resistance to abrasion.

Its general object is to provide an improved method and apparatus adapted to give reliably accurate abrasion tests in a convenient and economical manner. More specific objects are to provide comparative tests of different specimens under more nearly identical test conditions than have heretofore been had; to provide such tests for samples of such small size as to be obtainable from small articles or masses of the material concerning which the data is desired; and to provide simple and compact apparatus for the purposes stated.

Figure 1:
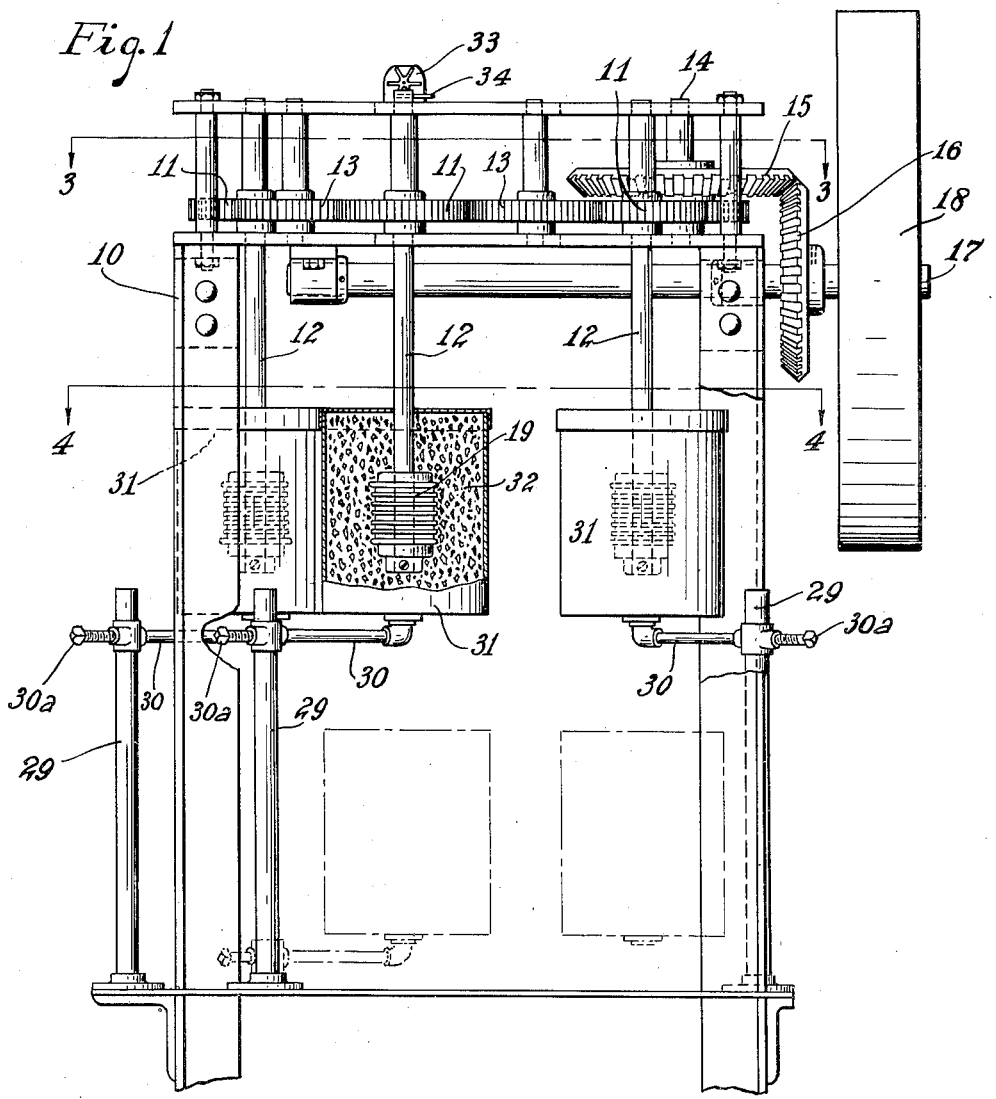
Fig. 1 is a side elevation, with parts broken away, of a preferred form of apparatus embodying and adapted to carry out my invention.

In testing specimens by my method I rotate the specimens in contact with a mass of loose abrading material such as finely-divided carborundum, and determine the loss of material resulting therefrom. Further features of my method will appear hereinafter.

Referring to the drawings, 10 represents generally a frame in which are journaled on vertical axes a number of gears 11, 11, secured respectively on shafts 12, 12, said gears being or uniform size and lying in the same horizontal plane, and said shafts having free downwardly-extending ends. Positioned alternately with the gears 11 and intermeshed therewith are gears 13, 13, all of the latter being idlers except one, which is secured to a common shaft 14 with a beveled gear 15 meshed with a bevel gear 16 secured upon a common horizontal shaft 17 with a driving pulley 18. The shafts 12 are thus adapted to be driven at the same speed and, as here shown, in the same direction. The gears 11 and 13 are preferably arranged in a closed circular chain, as shown, for compactness, although I do not wholly limit my claims to this specific arrangement.

Figure 2:
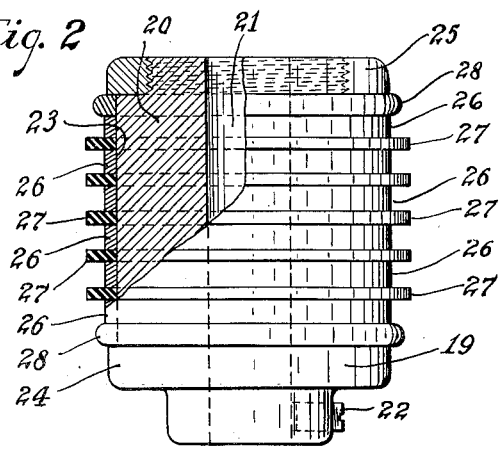
Fig. 2 is a side elevation, partly in section, on a larger scale, of the sample-holding head.
Figure 3:
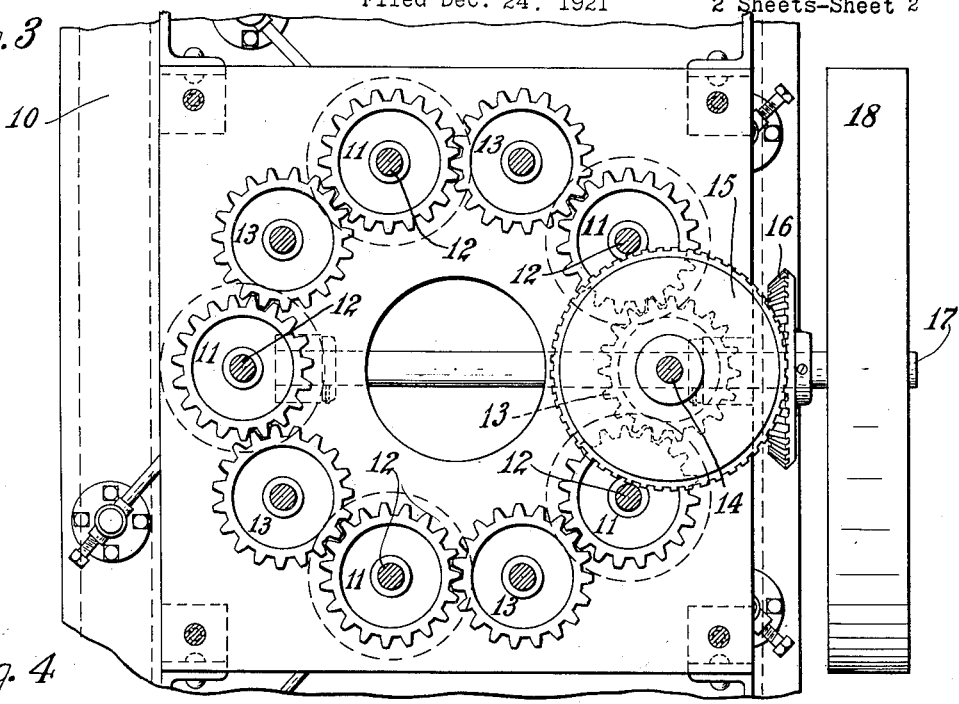
Fig. 3 is a horizontal section on 3—3 of Fig. 1.
Figure 4:
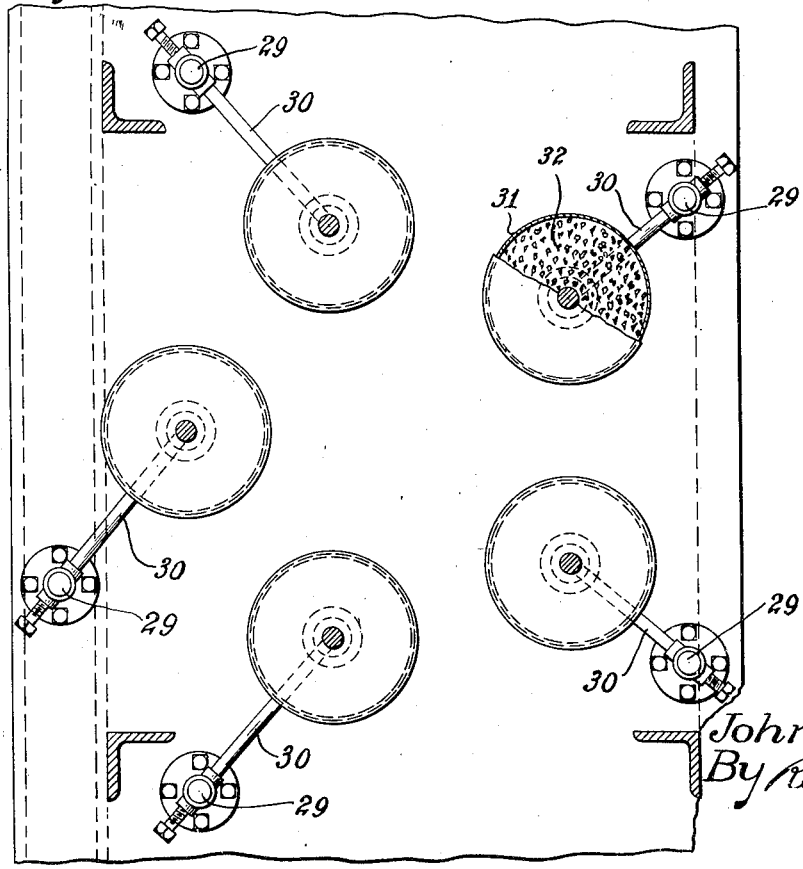
Fig. 4 is a horizontal section on 4—4 of Fig. 1.

Upon the lower end of each of the shafts 12 is secured a sample-holding head 19, shown in detail in Fig. 2, comprising a spool-like member 20 formed with an axial bore 21 to receive the lower end of the shaft and provided with a set screw 22 for securing it upon the shaft. The member 20 is formed with a cylindrical outer surface 23, preferably concentric with the shaft 12, as shown, bounded at the bottom by an annular shoulder or end-flange 24, and 25 is a circular nut threaded onto the upper end of said member 20 and constituting an upper end-flange therefor, being thus adapted to clamp in position on the cylindrical portion 23 an alternating series of metal spacer rings 26, 26 and ring-shaped test-pieces 27, 27, the latter being in this instance of rubber, said pieces being of greater outside diameter than the spacer rings, so as to extend into the abrasive material in which the sample-holding head is buried, as will presently be described. 28, 28 are metal rings or guard-members, of greater outside diameter than the rings 26, which may be inserted at the ends of the series of rings and test pieces, each having approximately the mean outside diameter of a test piece, so as to produce substantially the same test-conditions on the upper and lower faces respectively of the adjacent test piece as the latter is revolved in the abrasive material.

The frame-work of the machine includes a set of standards 29, 29, on each of which is secured, by a set screw 30ª, a vertically adjustable bracket 30, adapted to support a canister 31, filled with loose abrading material, 32, such as finely divided carborundum, said abrading material preferably being of uniform fineness. The brackets 30 are adapted to be raised to bring the canisters into operative position, with the sample-holding heads 19 buried in the abrading material, and to be lowered therefrom for the removal of the sample-holding head or the refilling of the canister.

A star-wheel counter 33 (Fig. 1), actuated by a finger 34 secured to the shaft of one of the gears 11, is provided for recording the number of revolutions of the sample-holding heads.

In the practice of my invention, the sample-holding heads 19 are removed from the shafts 12, the rings 27 of the material to be tested, suitably formed, are mounted on the respective heads alternately with the spacer rings 26, as shown clearly in Fig. 2, and clamped in position by setting up the nuts 25. Each head is then replaced upon its shaft 12, the canisters are raised until the abrasive material envelops the head, which may be facilitated by turning the head or the canister as the latter is raised, and the canisters are thus held by setting up the screws 30$^a$.

The apparatus being then as shown in Fig. 1, power is applied through the pulley 18, revolving the sample-holding heads 19 and causing the abrading material 32 to act with a substantially uniform abrading action upon the several test pieces.

One of the test pieces, or one test piece on each head, in the same or successive tests, may be taken from a standard specimen or composition of material, and the amount of abrasion resulting in different pieces used in the same or successive tests may be referred to it, for convenience in comparing and recording their resistance to abrasion.

In testing rubber compositions, for example, for which my invention is particularly well adapted, I prefer to rotate the heads at the rate of about 150 R. P. M., which raises the temperature only to about 150° or 160° F., and after a substantial part of the test pieces have been worn away they may be removed and weighed to determine the loss of each.

My invention provides a convenient and accurate test, the tests may be run in a reasonable time without excessive heating, and samples small enough to be cut from many finished articles may be used. Comparative tests of different specimens may be had under substantially identical conditions, as the local variations in the character of the abrasive material or its condition due to the particles worn off of the test pieces are comparatively small. The stiffness of the material tested is not a substantial factor when the test pieces are circular and concentrically mounted, as shown, and are rotated, on a fixed axis, in their own plane. The abrasive can be screened and used repeatedly. A large number of samples may be tested in one operation.

While I have shown my preferred form of apparatus and have described my preferred course of procedure, modifications of both may be resorted to without departing from the scope of my invention, and I do not wholly limit my claims to the specific form of my invention herein shown and described.

I claim:

1. The method of making abrasion tests which comprises forming a flat, circular ring of the material to be tested, holding said ring by applying clamping pressure axially to its inner periphery, burying it in loose abrading material, rotating it in its own plane while so buried, and determining the loss of material resulting therefrom.

2. The method of making abrasion tests which comprises forming rings of substantially the same size and shape from material to be tested and from a standard material, rotating said rings in their own planes in contact with loose abrading material of substantially uniform character for the same number of revolutions, and at the same speed, and determining the quantity of substance lost by each in the operation.

3. The method of making abrasion tests which comprises forming test pieces of substantially the same size and shape from different materials, securing said test pieces upon a common support, packing loose abrading material about said test pieces, rotating said support, and determining the quantities of material lost by each test piece in the operation.

4. The method of making abrasion tests which comprises forming rings of substantially the same size and shape from different materials, securing said rings in parallel, concentric relation to each other, packing loose abrading material about said rings, rotating said rings, and determining the respective quantities of material lost by each ring in the operation.

5. The method of making abrasion tests which comprises forming rings of different materials, securing said rings in parallel, concentric relation to each other, with substantially equal surface areas exposed, burying said rings in loose abrading material, rotating said rings on their common axis while they are so buried, and determining the loss of material resulting therefrom in each.

6. Apparatus for making abrasion tests comprising a sample-holding member, means for holding a quantity or loose abrading material in contact with a sample mounted on said member, means for rotating said sample-holding member or said material holding means relatively to the other about an axis lying within the figure of a sample mounted on said sample-holding member, and a revolution counter.

7. Apparatus for making abrasion tests comprising a plurality of sample-holding heads, means connecting said heads for rotating them at the same speed about their own respective axes, and means for holding a quantity of loose abrading material about said heads.

8. Apparatus for making abrasion tests comprising a plurality of sample-holding heads, means connecting said heads for rotating them at the same speed about their own respective axes, means for holding a quantity of loose abrading material about said heads, and a revolution counter.

9. Apparatus for making abrasion tests comprising a sample-holding head, means for clamping a plurality of ring-shaped test pieces in concentric, parallel relation to each other on said head, means for rotating said head, and means for holding a quantity of loose abrading material in contact with said test pieces.

10. Apparatus for making abrasion tests comprising a plurality of parallel, downwardly-extending stub shafts, means for turning said shafts at the same speed, a sample holding head secured to the lower end of each shaft, and a vertically movable container adapted to be raised to surround one or more of said heads and to be lowered to clear the same.

11. Apparatus for making abrasion tests comprising a plurality of parallel shafts arranged in a circular series, a sample-holding head secured to each shaft, a closed chain of gears adapted to turn said shafts at the same speed, and means for holding loose abrading material about said heads.

12. Apparatus for making abrasion tests comprising a sample-holding head formed with a cylindrical surface, a plurality of rings adapted to be assembled alternately with ring-shaped test-pieces to hold the latter in parallel, concentric, spaced relation to each other on said cylindrical surface, and means for clamping said rings and ring-shaped test pieces against each other.

13. Apparatus for making abrasion tests comprising a sample-holding head, means for holding a plurality of ring-shaped test pieces in parallel, concentric relation to each other on said head, a ring shaped guard-member on said head in parallel, spaced relation to one of said test-pieces, and a container adapted to hold loose abrading material about said head.

14. Apparatus for making abrasion tests comprising a sample-holding head formed with a cylindrical surface, ring-retaining means on said head at one end of said surface, a plurality of axially slidable rings adapted to be assembled alternately with ring-shaped test-pieces to hold the latter in parallel, spaced relation to each other on said surface, and a retaining member for said rings secured on said head.

In witness whereof I have hereunto set my hand this 20th day of December, 1921.

JOHN C. SPROULL.